United States Patent [19]

Myers et al.

[11] Patent Number: 5,602,186

[45] Date of Patent: Feb. 11, 1997

[54] RUBBER DEVULCANIZATION PROCESS

[75] Inventors: Ronald D. Myers; Peter Nicholson; John B. MacLeod; Michael E. Moir, all of Calgary, Canada

[73] Assignee: Exxon Research and Engineering Company, Florham Park, N.J.

[21] Appl. No.: 549,593

[22] Filed: Oct. 27, 1995

[51] Int. Cl.$^6$ .................................................. C08J 11/10
[52] U.S. Cl. ............................................................. 521/41
[58] Field of Search .................................................. 521/41

[56] References Cited

U.S. PATENT DOCUMENTS

| | | | |
|---|---|---|---|
| 3,787,315 | 1/1974 | Bearden, Jr. et al. | 208/208 M |
| 3,976,559 | 8/1976 | Bearden, Jr. et al. | 208/89 |
| 4,161,464 | 7/1979 | Nicholas | 521/43 |

OTHER PUBLICATIONS

Kirk–Othmer, Encyclopedia of Chemical Technology, "Recycling (Rubber)". vol. 19, p. 1005.

*Primary Examiner*—Thomas Hamilton, III
*Attorney, Agent, or Firm*—Joseph J. Dvorak

[57] ABSTRACT

A process for devulcanizing a rubber vulcanizate by desulfurization involves suspending a rubber vulcanizate crumb in a solvent which preferably swells the rubber vulcanizate before or during the devulcanization reaction and adding an alkali metal, such as sodium, to the suspension. The alkali metal cleaves mono-, di- and polysulfidic cross-linkages in the rubber vulcanizate to liberate rubber polymer having a molecular weight substantially equal to that of the rubber polymer prior to vulcanization. Carbon black may also be recovered for re-use in accordance with the process of the present invention. Devulcanized rubber may be subjected to a re-vulcanization reaction without separation of rubber polymer from the solvent by addition of an appropriate curing mixture.

26 Claims, 2 Drawing Sheets

RUBBER DEVULCANIZATION PROCESS

FIELD OF THE INVENTION

The present invention relates to the field of rubber recycling and, in particular, to a devulcanization process for recycling vulcanized rubber, such as tire rubber.

BACKGROUND OF THE INVENTION

Since the discovery of the vulcanization process in the mid-1800's, there has been much interest in recycling of vulcanized rubber, such as discarded tires and tire factory wastes.

One method for recycling tire rubber involves shredding tires and reforming the shredded tire into low specification materials such as rubber mats, rubber blocks and vehicle mud flaps. Shredded tire rubber has also been suggested as an additive to road asphalt. Another method for recycling tire rubber involves subjecting tires to a pyrolysis reaction to produce a high API gravity, low sulfur, aromatic oil which is useful as a fuel. However, these recycling processes are generally not economic and produce a low quality rubber product. Accordingly, discarded tires are currently being stockpiled and/or landfilled. This is not a suitable solution as evidenced by the recent large tire fire in Hagersville, Ontario, Canada. Clearly, discarded tires represent a considerable environmental liability.

In the vulcanization process, rubber polymer is cross-linked with sulfur, usually with the application of heat. Unfortunately, cross-linked rubber polymer cannot be reclaimed into a useful product merely by heating and re-processing. Sulfidic cross-linking represents a significant problem in recycling of rubber vulcanizate and in the recovery of the starting material rubber polymer from vulcanized rubber.

A review of methods for devulcanizing rubber vulcanizate is presented in "Methods of Devulcanization" (Warner, Walter C. *Rubber Chem Technol* 67:3:559–566;1994). The reviewed methods include catalysis with a quaternary ammonium chloride catalyst having a large hydrocarbon radical attached to nitrogen; grafting ethyl acrylate onto ground polybutadiene-vulcanizate waste; dissolving rubber in o-dichlorobenzene with 2,2A'-dibenzamidodiphenyl disulfide; applying microwave energy at a specified frequency and energy level; subjecting rubber to ultrasonic waves; and biodegradation with thermophilic bacteria. Chemical probes for reacting with sulfidic cross-links are also discussed and include triphenylphosphine and sodium di-n-butyl phosphite, propane-thiol/pipefidine, dithiothreitol, lithium aluminum hydride, aniline-sodium solution, phenyl lithium in benzene and methyl iodide.

Many of these prior art processes require the use of a digester and/or require stirring for many hours. Other disadvantages include expensive reagents, inefficient reactions and uneconomic processes. Other reactions may involve pyrolysis which will remove the sulfur but the polymer is broken down as a result.

It is therefore desirable to provide a process which can efficiently devulcanize a rubber vulcanizate matrix to recover the original polymeric constituents, as well as other tire constituents, such as carbon black.

It is an object of the present invention to selectively remove sulfur cross-links found in rubber vulcanizate to recover a reusable rubber polymer.

SUMMARY OF THE INVENTION

According to one aspect of the present invention, there is provided a process for devulcanizing a rubber vulcanizate by desulfurization, comprising the steps of: contacting rubber vulcanizate crumb with a solvent and an alkali metal to form a reaction mixture; and heating the reaction mixture in the absence of oxygen and with mixing to a temperature sufficient to cause the alkali metal to react with sulfur in the rubber vulcanizate, thereby devulcanizing the rubber.

According to another aspect of the present invention, there is provided a process for devulcanizing a rubber vulcanizate containing carbon black, comprising the steps of: contacting rubber vulcanizate crumb with a solvent to form a rubber vulcanizate dispersion; heating the rubber vulcanizate dispersion in the absence of oxygen thereby forming a carbon black dispersion in a rubber solution; separating at least a portion of the carbon black from the rubber solution; adding an alkali metal to the the rubber solution to form a reaction mixture; and further heating the mixture in the absence of oxygen and with mixing to a temperature sufficient to cause the alkali metal to react with the sulfur in the mixture, thereby devulcanizing the rubber.

BRIEF DESCRIPTION OF THE DRAWINGS

In drawings which illustrate embodiments of the present invention.

DETAILED DESCRIPTION OF THE PREFERRED EMBODIMENTS

Figure 1:
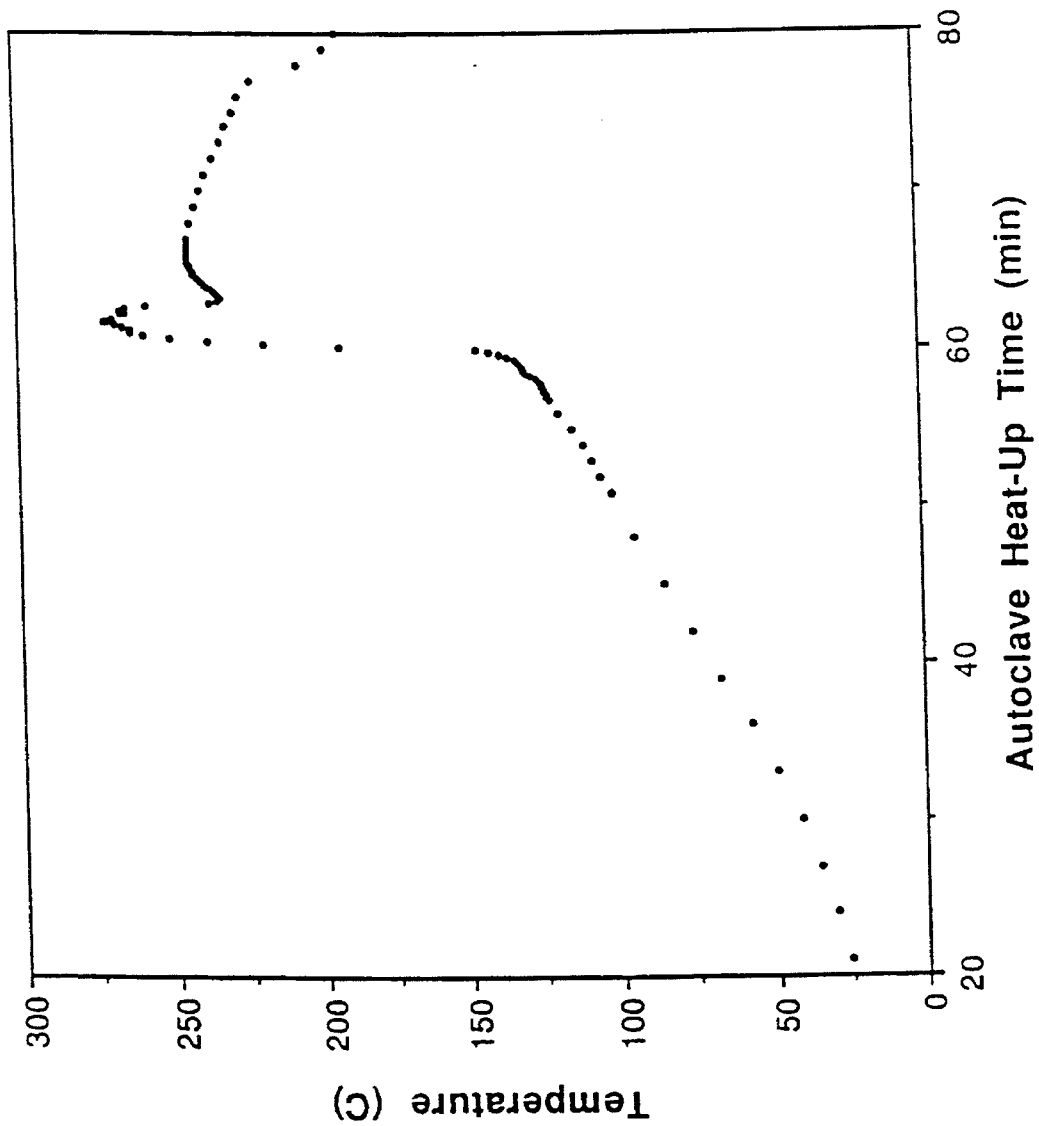
FIG. 1 is a temperature-time reaction profile of a desulfurization/devulcanization process in accordance with the present invention.

In accordance with a process of the present invention, rubber vulcanizate, such as discarded tires and tire factory waste, is desulfurized and therefore devulcanized by reaction with an alkali metal. The rubber polymer recovered from the process of the present invention has a molecular weight substantially equal to that of the rubber polymer prior to vulcanization. Devulcanization herein is defined as cleaving of mono-, di- and polysulfidic cross-links formed during the initial vulcanization process of the green rubber. Therefore, in accordance with the present invention, devulcanization occurs by desulfurization.

A particularly suitable application of the rubber devulcanization process of the present invention is for the recovery of a useable rubber polymer from discarded tires and tire factory waste material. The rubber vulcanizate tire crumb is first shredded, chopped or cut, in a manner known to those skilled in the art, to a vulcanizate crumb. Discarded tires and tire factory waste material are advantageously first treated in a manner known to those skilled in the art to separate any steel and/or fiber from the tire before or after preparing the rubber vulcanizate crumb.

The vulcanizate rubber crumb is then dispersed in a solvent which preferably swells the rubber vulcanizate before or during the devulcanization reaction. Suitable solvents include one or more of toluene, naphtha, terpenes, benzene, cyclohexane, diethyl carbonate, ethyl acetate, ethylbenzene, isophorone, isopropyl acetate, methyl ethyl ketone, derivatives thereof and the like. Preferably, the solvent has a relatively low boiling point to assist in removal of solvent by flashing, as will be discussed in more detail below. Another advantageous property of the solvent is a good solubility of liberated rubber polymer. It is believed that the devulcanization reaction may be enhanced by solubilizing the liberated rubber polymer in the solvent during the reaction. Preferably, the solvent does not react and hence consume alkali metal. Examples of solvents which consume alkali metal are mercaptans, chlorinated solvents and amines.

Suitably, the solvent is used in an excess to provide a good dispersion of vulcanizate rubber crumb in the solvent. Preferably, the solvent is used in an excess of at least about 2:1 by weight. The ratio of solvent to rubber vulcanizate is somewhat dependent on particle size of the crumb and may vary from about 2:1 to 4:1 to achieve good mixing. A higher ratio of solvent to rubber vulcanizate may be used; however, it will be appreciated by those skilled in the art that it is desirable to use as little solvent as possible for economy and efficient handling.

An alkali metal is added to the tire crumb dispersion. Suitable alkali metals are sodium, potassium, lithium and cesium. The preferred alkali metal is sodium. The alkali metal is used in a molar excess in the range of from about 2:1 to 9:1 based on the sulfur content in the tire rubber crumb. Typically, the sulfur content in a tire rubber vulcanizate is about 2% by weight. The theoretical molar ratio of alkali metal to sulfur is 2:1 for the desulfurization process of the present invention. However, other components, such as organic acids and zinc oxide, may be present in the rubber vulcanizate which will consume the alkali metal. Accordingly, the molar ratio of alkali metal to sulfur is advantageously about 4:1. Hereinafter, references to sodium are intended to include any alkali metal. A high molar ratio may not be necessary or economical for certain applications of the recovered rubber polymer wherein a small amount of sulfur may be tolerated.

Desirably, the devulcanization process is conducted in the absence of oxygen. Thus, the reaction vessel containing the mixture is purged with nitrogen to replace oxygen; or, in one embodiment of the present invention, molecular hydrogen is added at a hydrogen pressure of from about 345 to 3450 kPa. Preferably, the hydrogen pressure is about 1380 kPa.

In the process of the present invention, hydrogen caps radicals which are formed when the sulfur cross-links are removed by sodium. When the process is conducted in a nitrogen atmosphere, the radicals formed are capped by internal hydrogen abstraction reactions which increases the degree of unsaturation in the resulting polymer. Also, carbon-carbon cross-linking can occur, resulting in an enhanced rubber.

The mixture is stirred while heating in the reaction vessel. The shear rate of the stirring should be sufficient to form high surface area, small particle size sodium when the melting point of sodium is achieved. Heating should be sufficient to cause the alkali metal to react with sulfur in the vulcanizate; however, the temperature should not exceed that which would cause thermal cracking of the rubber polymer. Typically, the mixture is heated from ambient temperature to about 250° C. and as can be seen in FIG. a rapid exothermic reaction begins at about 125° C. in the present system, the heat release of which must be considered during the heating step. It is preferred to control the temperature to below about 300° C. or where thermal cracking of rubber polymer is initiated. Heating is, of course, continued for a time sufficient to completely devulcanize the rubber and as FIG. 1 shows this is rapid, requiring only several minutes.

The pressure at which the process is conducted is not critical. Thus, the heating and stirring may also be conducted at atmospheric pressure. If a closed reaction vessel is used, higher pressures will result, for example, pressures up to about 200 kPa.

In another embodiment of the present invention, rubber vulcanizate, once dispersed in a solvent, is heated in the absence of oxygen first for a time and at a temperature sufficient to thermally decompose at least a portion of the rubber and to liberate carbon black. Preferably, the dispersion is heated to a temperature of less than about 300° C., more preferably less than about 250° C. but above ambient temperature, to minimize unwanted thermal cracking of rubber polymer. Carbon black from the rubber vulcanizate is then separated from the solvent/polymer phase, for example by filtration, centrifugation or hydrocyclone. Other contaminants, for example zinc oxide, which consume alkali metal are largely removed with the carbon black, thereby reducing the amount of alkali metal required for the subsequent devulcanization reaction. A rubber vulcanizate may contain up to 2% zinc oxide so that removal of a significant amount of the zinc oxide with carbon black results in a significant reduction in subsequent consumption of alkali metal. After removal of the carbon black, alkali metal is then added to the solvent/rubber polymer dispersion and the reaction vessel is purged of oxygen using nitrogen and/or hydrogen. The mixture is then heated and stirred as previously described and the rubber is devulcanized in an exothermic reaction.

The desulfurization/devulcanization reaction is rapid and, once the reaction is complete, the reactor begins to cool. Although thermodynamic measurements have not been made for the devulcanization reaction of the present invention, the heat released in the reaction is anticipated to be similar to that of the desulfurization of methyl phenyl sulfide, for example, as shown below:

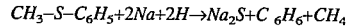

for which $\Delta H°$ at 298° C. is $-446.8$ kJ/mole methyl phenyl sulfide.

The desulfurization/devulcanization reaction of the present invention may be described generally as follows:

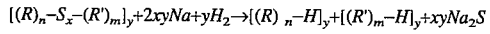

wherein $[(R)_n–S_x–(R')_m]_y$ represents a rubber vulcanizate, $(R)_n$ and $(R')_m$ represent the same or different rubber polymers having n and m monomer units, respectively, x is the number of sulfur atoms cross-linked in mono-, di- and polysulfidic linkages and y is the total chain length of the rubber vulcanizate.

The devulcanized rubber is then subjected to a quenching step to remove any unreacted sodium metal. Preferably, the quenching step is conducted as follows: the mixture is preferably cooled to below 200° C; water is injected and the mixture is stirred to convert unreacted sodium to sodium hydroxide. Sodium hydroxide, water soluble sodium salts and other inorganic materials used in tire formulation and released during the devulcanization process are dispersed in the aqueous phase. It is not necessary to cool the reaction mixture prior to water injection but a cooling step is preferred to minimize the resultant increase in pressure. Carbon black becomes water-wet and is readily removed in the aqueous phase from the solvent/rubber polymer organic phase by centrifugation, filtration or hydrocycloning. Carbon black may then be re-used. The remaining water-soluble salts may be disposed of or recovered using techniques known to those skilled in the art.

Solvent is flashed from the resultant solvent/rubber polymer phase to yield a rubber polymer mixture having a range in molecular weight which is substantially equal to that of the rubber polymers prior to vulcanization. The resultant polymer mixture may then be revulcanized with sulfur and other components, such as carbon black, to produce a rubber vulcanizate of the desired properties, for example, for new tires. The rubber polymer may also be used as a polymeric glue for binding tire crumb into useful products, such as those mentioned previously herein.

Alternatively, the quenching step may be conducted by addition of hydrogen sulfide gas. In this embodiment of the quenching step, the devulcanized rubber polymer solution is preferably cooled to a temperature of less than about 100° C. to minimize solvent-flashing when the reaction vessel is vented to atmosphere. Hydrogen sulfide gas is added at its vapour pressure of about 1550 kPa. The quenching step may be conducted without cooling but it may then be necessary to pump the hydrogen sulfide gas in under pressure. The mixture is then heated to a temperature of at least about 100° C. while stirring at a high shear rate to react any unreacted sodium with hydrogen sulfide to form sodium hydrosulfide. The reactor is cooled, vented to atmosphere, and purged with nitrogen to remove any unreacted hydrogen sulfide gas. Solids, including carbon black, are removed from the organic phase by centrifugation and/or filtration. Solvent is flashed from the resultant solvent/rubber polymer phase to yield a rubber polymer of substantially the same molecular weight as the rubber polymers prior to vulcanization. Sodium sulfide produced during devulcanization is converted into sodium hydrosulfide during the hydrogen sulfide quenching step.

One disadvantage of this quenching step, as compared with the preferred quenching step described previously herein, is that some fine carbon black material remains associated with the recovered devulcanized rubber polymer. However, if the rubber polymer is to be re-used for a product which contains some carbon black, for example for new tires, the presence of some carbon black in the recovered rubber polymer may not represent a significant processing problem. Advantages of the water quenching step over the hydrogen sulfide quenching step include safety, cost of reagents and separation of carbon black is facilitated.

In another embodiment, the aqueous and organic phases formed in the aqueous quenching step described above are not separated. Instead, a curing mixture including rubber curing additives, sulfur, accelerators and/or anti-oxidants in combinations and proportions well known in the art, for example, are added to the solvent/water/ devulcanized rubber polymer slurry to re-vulcanize the rubber polymer. If carbon black was removed from the rubber polymer during the process, the curing mixture may also include carbon black or another filler. The solvent and water are flashed from the resultant rubber revulcanizate. This reaction may also be conducted following quenching by the addition of hydrogen sulfide.

The following Examples illustrate the present invention. The rubber vulcanizate used in the Examples was a passenger vehicle tire crumb having a sulfur content of approximately 1.7% by weight as determined using a Leco™ sulfur analyzer.

EXAMPLE 1

100 g of a 30 mesh passenger tire crumb, having a sulfur content of 1.7% by weight, was added to a stainless steel autoclave liner. 350 g of toluene was added to the tire crumb. 4.9 g of sodium metal was added to the tire crumb dispersion to give a molar ratio of sodium:sulfur of 4.0.

The autoclave liner was placed in an autoclave. The autoclave was purged first with nitrogen to remove any oxygen and then with hydrogen to a hydrogen pressure of 1380 kPa.

The heaters were turned on and the mixture in the autoclave was initially stirred at a rate of from about 600 to 800 rpm with a MagneDrive®II stirrer. At 100° C. (sodium melts at about 98° C.), the stirring speed was increased to about 1800 rpm to ensure good mixing of the tire crumb with molten sodium.

Referring now to the temperature/time reaction profile of FIG. 1, a rapid exothermic reaction began at about 125° C. and elevated the temperature to a peak of about 275° C. It was during this exothermic reaction that sulfur was removed from the rubber to produce sodium sulfide.

The heaters were shut off when the temperature reached 250° C. to ensure that the temperature in the autoclave did not exceed 300° C. as a result of the exothermic reaction. During the course of the desulfurization/devulcanization reaction, the pressure in the autoclave increased to a maximum of about 2930 kPa.

After the reaction was complete, the autoclave cooled and at about 225° C., while stirring at about 1800 rpm was maintained, the reaction mixture was quenched by the addition of 75 ml of water at a rate of 25 ml/min. The water reacted with any unreacted sodium to produce sodium hydroxide. The reaction mixture was then allowed to cool to room temperature.

Gas chromatographic analysis of the gas remaining in the autoclave following the quenching step and after cooling to room temperature showed that very little gas was produced during the reaction, demonstrating advantageously that little, if any, thermal cracking occurred during the reaction of the present invention.

The autoclave was opened and a black slurry was observed. The slurry was poured into a pan and placed in a fumehood and then a low temperature oven to remove toluene and water by evaporation. After the solvent was removed, a strong rubbery mat-like material remained.

EXAMPLE 2

The process described in Example 1 was repeated with 10 mesh tire crumb. However, after cooling the resultant black slurry was poured into centrifuge tubes. The reaction products were then centrifuged at 13,000 rpm for 2 hours to separate the solvent/polymer organic phase from the aqueous/solid phase. The phase separation was very good. A dark coffee colored solvent/rubber polymer organic phase was carefully decanted from the aqueous/solid phase. Carbon black was recovered as a solid.

The solvent was removed from the solvent/rubber polymer mixture by rotary evaporation. The yield of rubber polymer was about 60% by weight based on the weight of tire crumb starting material. The rubber polymer was a very, tacky material having an infrared spectrum consistent with known high molecular weight rubber polymers.

The molecular weight of the rubber polymer was determined by gel permeation chromatography using trichlorobenzene as solvent and a refractive index detector. The rubber polymer had a bimodal molecular weight distribution. The higher molecular weight peak had a molecular weight distribution in the range of from about 12,000 to 74,000 with an average molecular weight of about 32,000, based on polystyrene equivalents. The sulfur content was 0.37% by weight.

EXAMPLE 3

The process described in Example 2 was repeated. However, prior to heating, the autoclave was purged with nitrogen and no hydrogen was added.

The sulfur content of the devulcanized rubber polymer was found to be 0.46% by weight. The molecular weight of the resultant rubber polymer had a bimodal distribution with the high molecular weight peak having a molecular weight distribution of from about 13,000 to 84,000 and an average molecular weight of about 36,000. A comparison of the high molecular weight peaks of Examples 2 and 3 suggests that some carbon-carbon cross-linking occurs during the devulcanization reaction when the reaction is conducted with a nitrogen purge alone and in absence of molecular hydrogen.

EXAMPLE 4

The reaction of Example 1 was repeated up to the water-quenching step. The autoclave was allowed to cool to about 100° C. and the pressure was reduced to less than 345 kPa. Hydrogen sulfide gas was added at its vapour pressure at room temperature (about 1550 kPa) while rapidly stirring the mixture at about 1800 rpm. The autoclave was then heated to above about 100° C. to ensure good contact between any remaining molten sodium metal and hydrogen sulfide gas.

The autoclave was then cooled to room temperature and purged with nitrogen prior to opening. The contents were removed from the autoclave and the toluene was removed by evaporation, yielding a rubbery mat-like material.

DISCUSSION OF EXAMPLES 1–4

The rubber polymer recovered in Examples 2 and 3 had a sulfur content of about 0.3–0.4% by weight. This is significantly reduced compared to a typical sulfur content of tire rubber of about 2% by weight. Very low sulfur levels (<0.1% by weight) have been achieved at higher Na:S ratios (see Table I). However, it is believed that further reductions in the sulfur content are possible only to a molar ratio of sodium to sulfur of about 6:1. This high molar ratio may not be necessary or economical for certain reprocessing applications of the recovered rubber polymer. Nonetheless, it appears that the process of the present invention effectively cleaves the mono-, di- and polysulfidic cross-links of the rubber polymer(s).

It is believed that at least a portion of the residual sulfur content in the rubber polymer produced in Examples 2 and 3 was due to incomplete mixing in the non-ideal autoclave reactor and/or entrainment of microcrystalline sodium sulfide in the polymer.

Analyses of additional recovered polymer as compared with the rubber vulcanizate starting material are presented in Table I.

TABLE I

| Sample | Na:S (molar) | Sulfur (ppm, wt) | Carbon (wt %) | Hydrogen (wt %) | Zinc (ppm, wt) |
|---|---|---|---|---|---|
| A | — | 20000 | — | — | 19500 |
| B | 0 | 12000 | 87.4 | 10.33 | 316 |

TABLE I-continued

| Sample | Na:S (molar) | Sulfur (ppm, wt) | Carbon (wt %) | Hydrogen (wt %) | Zinc (ppm, wt) |
|---|---|---|---|---|---|
| C | 9:1 | 600 | 87.9 | 10.88 | 0 |
| D | 9:1 | 600 | 88.1 | 10.85 | 0.9 |

Sample A represents the tire crumb starting material. Sample B represents thermal treatment of tire crumb in solvent without the addition of alkali metal. Samples C and D are samples treated by the process of the present invention.

The results presented in Table I show an increase in hydrogen content in the desulfurized rubber polymer (Samples C and D) as a result of hydrogen capping radicals formed during the devulcanization reaction. Carbon-carbon double bonds are not hydrogenated under the temperature and pressure conditions of the reaction. Sample B shows a significantly lower hydrogen content because sulfur was not substantially removed in the thermal treatment of the tire crumb.

Zinc, which is also present in large amounts in tire crumb (1.9% by weight), is largely removed by thermal treatment and completely removed with addition of sodium. The difference in the zinc content between Samples A and B is indicative of the benefits of the embodiment of the process of the present invention wherein the tire crumb dispersion is heated prior to addition of alkali metal. It is apparent from this difference that the alkali metal added to the dispersion can be significantly reduced because not as much is consumed by the zinc oxide.

The tire crumb used in the Examples had a particle size in the range of from about 10 to 30 mesh. It will be appreciated by those skilled in the art that smaller or larger vulcanizate may be treated effectively by the process of the present invention with other types of reactors.

Figure 2:
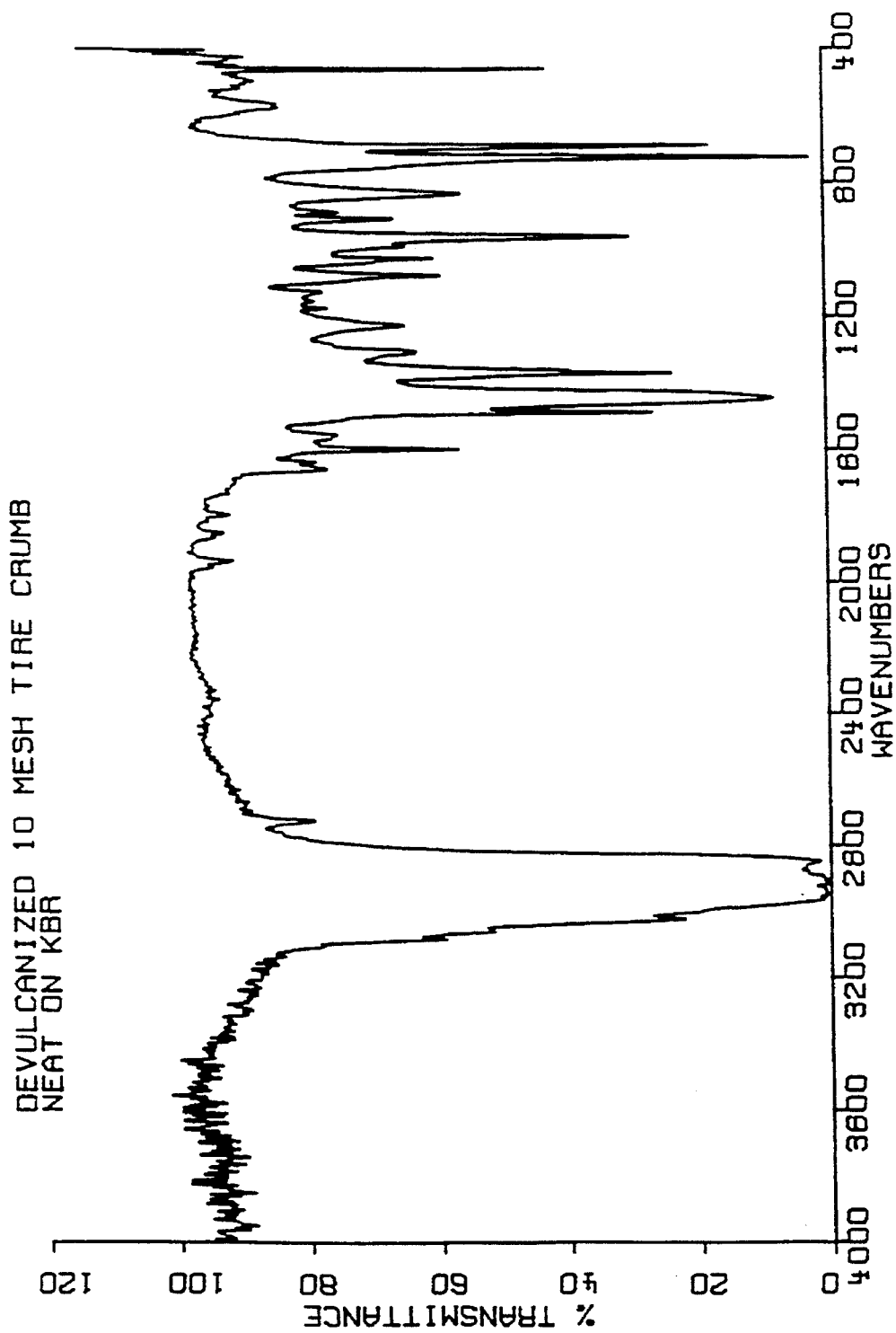
FIG. 2 is an infrared spectrum of a rubber polymer recovered by a process of the present invention.

An infrared spectrum of a polymer recovered by the process of the present invention is shown in FIG. 2. Although the tire crumb was produced from a variety of tire brands made from a variety of polymers, the infrared spectrum of FIG. 2 shows a devulcanized robber polymer which is representative of cis-polyisoprene or polybutadiene polymers or styrene-butadiene copolymers.

What is claimed is:

1. A process for devulcanizing a rubber vulcanizate by desulfurization, comprising the steps of:

contacting rubber vulcanizate crumb with a solvent and an alkali metal to form a reaction mixture; heating the reaction mixture in the absence of oxygen and with mixing to a temperature sufficient to cause the alkali metal to react with sulfur in the rubber vulcanizate; and maintaining the temperature below that at which thermal cracking of the rubber occurs, thereby devulcanizing the rubber vulcanizate.

2. The process of claim 1, wherein the temperature is maintained below about 300° C.

3. The process of claim 2, wherein the solvent is one capable of swelling the rubber vulcanizate.

4. The process of claim 3, wherein the solvent is one capable of solubilizing the devulcanized rubber.

5. The process of claim 4, wherein the solvent is selected from the group consisting of one or more of toluene, naphtha, terpenes, benzene, cyclohexane, diethyl carbonate, ethyl acetate, ethylbenzene, isophorone, isopropyl acetate, methyl ethyl ketone and derivatives thereof.

6. The process of claim 5, wherein the solvent is used in an excess of from about 2:1 to 4:1 by weight relative to the rubber vulcanizate crumb.

7. The process of claim 6, wherein the alkali metal is used in a molar excess of from about 2:1 to 9:1 relative to the sulfur content in the rubber vulcanizate.

8. The process of claim 7, wherein the alkali metal is sodium.

9. The process of claim 8, wherein the mixture is heated in the presence of nitrogen.

10. The process of claim 9, wherein hydrogen is added before heating at a hydrogen pressure of from about 345 to 3450 kPa.

11. The process of claim 1, further comprising the step of quenching the unreacted alkali metal.

12. The process of claim 11, wherein the quenching step comprises adding water to the reaction mixture.

13. The process of claim 11, wherein the quenching step comprises adding hydrogen sulfide gas to the reaction mixture and heating and stirring the resultant mixture.

14. A process for devulcanizing a rubber vulcanizate containing carbon black, comprising the steps of:

contacting rubber vulcanizate crumb with a solvent to form a dispersion;

heating the rubber vulcanizate dispersion in the absence of oxygen to a temperature sufficient to decompose at least a portion of the rubber to form a carbon black dispersion in a rubber solution;

separating at least a portion of the carbon black from the rubber solution;

adding an alkali metal to the separated rubber solution to form a reaction mixture; and heating the reaction mixture in the absence of oxygen and with mixing to a temperature sufficient to cause the alkali metal to react with the sulfur in the rubber and maintaining the temperature below that at which thermal cracking of the rubber occurs, thereby devulcanizing the rubber.

15. The process of claim 14, wherein the temperature is maintained below about 300° C.

16. The process according to claim 15, wherein the solvent is one capable of swelling the rubber vulcanizate.

17. The process according to claim 16, wherein the solvent is capable of solubilizing the devulcanized rubber.

18. The process of claim 17, wherein the solvent is selected from the group consisting of one or more toluene, naphtha, terpenes, benzene, cyclohexane, diethyl carbonate, ethyl acetate, ethylbenzene, isophorone, isopropyl acetate, methyl ethyl ketone and derivatives thereof.

19. The process of claim 18, wherein the solvent is used in an excess of from about 2:1 to 4:1 by weight relative to the rubber vulcanizate crumb.

20. The process of claim 19, wherein the alkali metal is used in molar excess of from about 2:1 to 9:1 relative to the sulfur content in the rubber vulcanizate.

21. The process of claim 20, wherein the metal is sodium.

22. The process of claim 20, wherein the mixture is heated in the presence of nitrogen.

23. The process of claim 20, wherein hydrogen is added before heating the reaction mixture at a pressure of from about 345 to 3450 kPa.

24. The process of claim 14, further comprising the step of quenching the unreacted alkali metal.

25. The process of claim 24, wherein the quenching step comprises adding water to the reaction mixture.

26. The process of claim 24, wherein the quenching step comprises adding hydrogen sulfide gas to the reaction mixture and heating and stirring the resultant mixture.

* * * * *